United States Patent [19]

Pattanaik

[11] 4,402,742

[45] Sep. 6, 1983

[54] IRON-NICKEL BASE BRAZING FILLER METAL

[75] Inventor: Surya Pattanaik, San Jose, Calif.

[73] Assignee: GET Products Corporation, Stamford, Conn.

[21] Appl. No.: 316,258

[22] Filed: Oct. 29, 1981

[51] Int. Cl.³ .................... C22C 38/54; C22C 30/00
[52] U.S. Cl. ........................... 75/123 B; 75/123 K; 75/123 L; 75/128 C; 75/128 F; 420/548
[58] Field of Search ............ 75/123 B, 123 K, 123 L, 75/128 C, 128 F, 134 F; 420/584

[56] References Cited

U.S. PATENT DOCUMENTS

| | | | |
|---|---|---|---|
| 2,880,086 | 3/1959 | Cape | 75/170 |
| 3,836,358 | 9/1974 | Jones | 75/128 F X |
| 4,066,447 | 1/1978 | Smith, Jr. et al. | 75/128 F X |
| 4,160,854 | 7/1979 | D'Silva | 428/607 |
| 4,169,744 | 10/1979 | D'Silva | 148/32 |

FOREIGN PATENT DOCUMENTS 53-34634  3/1978  Japan ..................... 128 C/

*Primary Examiner*—L. Dewayne Rutledge
*Assistant Examiner*—David A. Hey
*Attorney, Agent, or Firm*—Donald R. Castle

[57] ABSTRACT

Iron based brazing alloys selected from particular alloys of the B-Si-Ni-Fe and B-Si-Ni-Cr-Fe systems are practical substitutes for AMS4777 alloy (3B 4Si 7Cr 3Fe 83Ni).

3 Claims, No Drawings

IRON-NICKEL BASE BRAZING FILLER METAL

BACKGROUND OF THE INVENTION

Stainless steels, austenitic (AISI 304 and 347), ferritic (AISI 430) and martensitic (AISI 410) are extensively used for the fabrication of heat exchangers for gas turbines. AMS 4777 brazing alloy has heretofore been used for brazing these stainless steel components of gas turbines because it forms a strong and oxidation resistant brazed joint. The metallurgical composition of AMS 4777 is 7% by weight of chromium, 3% by weight of iron, 4% by weight of silicon, 3% by weight of boron and the balance, that is 83% by weight is nickel. The recommended brazing temperature range for AMS 4777 is from about 1010° C. to about 1177° C. with about 1035°–1040° C. being the preferred brazing temperature.

In recent years the cost of nickel has rapidly increased so that an alloy capable of being brazed within the recommended brazing temperature for AMS 4777 and having comparable properties for brazing stainless steels yet uses less expensive materials would be highly desirable.

SUMMARY OF THE INVENTION

In one aspect of this invention there is provided a brazing alloy consisting essentially of from about 1 to about 5% by weight of boron, from about 3% to about 6% by weight of silicon from 0 to about 12% by weight of chromium, from about 1 to about 45% by weight of nickel and balance iron. The brazing alloy has a maximum liquidus temperature of about 1130° C.

DETAILS OF THE PREFERRED EMBODIMENTS

For a better understanding of the present invention, together with other and further objects, advantages and capabilities thereof, reference is made to the following disclosure and appended claims in connection with the above description of some of the aspects of the invention.

While in general, the boron content in the alloys of this invention can vary from about 1 to about 5% by weight, boron lowers the liquidus temperature of the resulting alloy, hence the higher the level of boron the lower the liquidus temperature of the brazing alloy up to about 4% by weight and then the liquidus temperature increases. The preferred boron content is from about 3 to about 4.5% by weight.

Silicon also lowers the liquidus temperature in the iron base, B-Si-Cr-Ni-Fe system, however the effect is not as pronounced as for boron and the amount of silicon used varies from about 3% to about 6% by weight, with about 4 to 5% silicon being preferred.

Increasing the chromium level will increase the liquidus temperature in the B-Si-Cr-Ni-Fe system. About 12% by weight of chromium is all that can be utilized and have a liquidus temperature below about 1130° C. provided the B and Si are the recited levels. Chromium is not an essential ingredient but offers corrosion resistance to the brazed joint and when used is present in amounts of from about 3% to about 12% by weight.

Nickel depresses the liquidus temperature of the B-Si-Ni-Fe and of the B-Si-Cr-Ni-Fe systems. In Table I below the data for Alloy 1 and alloy 12 show that where B and Si are at the same level and no chromium is present, the substitution of 40% by weight of nickel for iron lowered the liquidus temperature 114° C. Further, comparing alloys 46 and 107 in the B-Si-Cr-Ni-Fe system it can be seen that the increased nickel content in alloy 107 lowers the liquidus temperature of alloys when the boron, silicon and chromium contents are relatively constant. The preferred level of nickel is from about 20% to about 40% by weight.

Various alloys are made and tested with the results as shown in Table I.

TABLE I

| Alloy | COMPOSITION (wt %) Elements | | | | | S* °C. | L* °C. | F* °C. |
|---|---|---|---|---|---|---|---|---|
| | B | Si | Cr | Ni | Fe | | | |
| 1 | 3.0 | 4.5 | 0 | 0 | 92.5 | 1156 | 1174 | — |
| 10 | 2.79 | 4.45 | 0 | 20.93 | 71.83 | 1040 | 1110 | 1108 |
| 11 | 2.82 | 3.93 | 0 | 24.42 | 68.83 | 1010 | 1083 | 1083 |
| 12 | 3.00 | 4.5 | — | 40.00 | 52.5 | 972 | 1060 | — |
| 14 | 3.39 | 4.22 | 0 | 10.86 | 81.53 | 1062 | 1112 | 1126 |
| 23 | 2.63 | 4.45 | 6.4 | 36.5 | 50.02 | 967 | 1110 | 1076 |
| 48 | 3.34 | 4.41 | 6.57 | 20.71 | 64.97 | 977 | 1105 | 1119 |
| 107 | 3.98 | 4.39 | 5.23 | 43.53 | 42.87 | 940 | 1014 | — |
| 108 | 3.62 | 4.37 | 4.44 | 37.36 | 50.21 | 968 | 1070 | — |
| 46 | 3.85 | 4.57 | 6.66 | 36.48 | 48.44 | 963 | 1065 | — |
| 104 | 4.1 | 4.4 | 6.3 | 21.67 | 63.53 | 1005 | 1130 | — |
| 109 | 4.39 | 4.33 | 6.44 | 34.77 | 50.07 | 970 | 1010 | — |
| 105 | 4.12 | 4.51 | 10.65 | 20.43 | 60.29 | 1015 | 1110 | — |
| 110 | 3.66 | 4.5 | 11.51 | 29.86 | 50.47 | 985 | 1120 | — |
| 106 | 3.39 | 4.42 | 15.83 | 21.02 | 55.34 | 1024 | 1185 | — |

*S—Solidus
*L—Liquidus
*F—Flow

Inverted T-joints of AISI 410 steel are brazed with some of the selected filler metals and AMS 4777 by brazing for about 30 minutes at the indicated brazing temperature. Well shaped fillets were formed in all cases.

The T-joints are sectioned, polished and metallographically examined. Knoop microhardness of base metal, base metal-brazing alloy interface, the resultant brazing alloy and of the hard phase present (if any) are taken and the results are shown in Table II. Except for two of the alloys that is Alloy 10 and Alloy 23 all others exhibited single phase brazing.

TABLE II
MICROHARDNESS OF T-JOINT SECTION

| Alloy # | Braze Temp °C. | Microhardness, KHN | | | | Hard Place |
|---|---|---|---|---|---|---|
| | | A | B | C | D | |
| 10 | 1100 | 616 | 801 | 549 | 810 | Yes |
| 11 | 1100 | 660 | 870 | 346 | — | No |
| 23 | 1100 | 587 | 728 | 305 | 549 | Yes |
| 46 | 1100 | 616 | 735 | 320 | — | No |
| 14 | 1125 | 485 | 557 | 454 | — | No |
| 48 | 1125 | 616 | 649 | 301 | — | No |
| AMS 4777 | 1038 | 498 | 406 | 416 | — | No |

A—Base Metal
B—Interface
C—Resultant Brazing Alloy
D—Hard Phase (if present)

The knoop microhardness values of the resultant brazing alloy from the claimed filler alloys are comparable with those obtained using AMS 4777, and would thus have comparable strength.

Alloys 107 and 109, containing high boron, have liquidus temperatures close to that of AMS 4777 (Table I). Thus a set of Fe-Ni base brazing alloys are provided that have same amount of B and Si as AMS 4777, but containing from about 45–80 percent iron, which can be used to braze stainless steels at temperatures up to about 125° C. above that used for AMS 4777. At current prices, the raw materials for the alloys of this invention are about 20 to 55% of the cost of raw materials for AMS 4777.

While there has been shown and described what are at present considered the preferred embodiments of the invention, it will be obvious to those skilled in the art that various changes and modifications may be made therein without departing from the scope of the invention as defined by the appended claims.

What is claimed is:

1. A iron nickel base brazing filler metal, consisting essentially of, by weight percent, about 1 to 5 percent boron, 3 to 6 percent silicon, 0 to 12 percent chromium, 1 to 45 percent nickel and balance essentially iron, having a liquidus temperature below about 1130° C.

2. An alloy according to claim 1 wherein the boron content is from about 3 to about 4.5% by weight, the silicon content is from about 4 to about 5% by weight and the nickel content is from about 20 to about 40% by weight.

3. An alloy according to claim 2 wherein the chromium is present in amounts of from about 3% to about 12% by weight.

UNITED STATES PATENT AND TRADEMARK OFFICE
CERTIFICATE OF CORRECTION

PATENT NO. : 4,402,742
DATED : September 6, 1983
INVENTOR(S) : Surya Pattanaik

It is certified that error appears in the above-identified patent and that said Letters Patent are hereby corrected as shown below:

On the title page:

The assignee for the subject patent should be -- GTE Products Corporation --.

Signed and Sealed this

Fifteenth Day of November 1983

[SEAL]

Attest:

GERALD J. MOSSINGHOFF

Attesting Officer     Commissioner of Patents and Trademarks